United States Patent
Catanzaro et al.

(10) Patent No.: US 6,217,761 B1
(45) Date of Patent: Apr. 17, 2001

(54) WASTEWATER TREATMENT SYSTEM PREVENTING THE BUILD UP OF SOLIDS BENEATH THE CLARIFIER OPENING

(75) Inventors: Michael David Catanzaro, Baton Rouge; Murphy Martin Arcemont, III, Gonzales; Raleigh Lee Cox, Baton Rouge; Christopher Edward Cox, Denham Springs; Travis Lee LeJeune, Baton Rouge, all of LA (US)

(73) Assignee: Delta Environmental Products, Inc., Denham Springs, LA (US)

( * ) Notice: Subject to any disclaimer, the term of this patent is extended or adjusted under 35 U.S.C. 154(b) by 0 days.

(21) Appl. No.: 09/363,506

(22) Filed: Jul. 29, 1999

(51) Int. Cl.$^7$ .................................................. C02F 3/20

(52) U.S. Cl. ...................... 210/195.4; 210/197; 210/220; 210/256

(58) Field of Search ............................. 210/195.3, 195.4, 210/197, 256, 202, 220

(56) References Cited

U.S. PATENT DOCUMENTS

| | | |
|---|---|---|
| 1,066,706 | 7/1913 | Caine . |
| 1,337,431 | 4/1920 | Berry, Jr. .............................. 210/320 |
| 1,381,615 | 6/1921 | Beeby ................................... 210/320 |
| 2,383,302 | 8/1945 | Feinauer et al. ........................ 210/43 |
| 2,638,643 | 5/1953 | Olson ........................................ 20/92 |
| 2,901,114 | 8/1959 | Smith et al. .......................... 210/200 |
| 2,987,186 | 6/1961 | Burgoon et al. ..................... 210/197 |
| 3,057,796 | 10/1962 | Davis .................................... 210/207 |
| 3,189,305 | 6/1965 | Willenborg ............................. 248/74 |
| 3,195,727 | 7/1965 | Kibbee ................................. 210/195 |
| 3,202,285 | * 8/1965 | Williams ............................ 210/195.4 |
| 3,299,417 | 1/1967 | Sibthorpe ............................. 340/242 |
| 3,347,381 | 10/1967 | Minch et al. ........................ 210/150 |
| 3,355,023 | 11/1967 | Foster .................................. 210/195 |
| 3,363,864 | 1/1968 | Olgreen ................................. 248/68 |
| 3,495,711 | 2/1970 | Englesson et al. ................... 210/195 |
| 3,507,393 | 4/1970 | Weis et al. ........................... 210/195 |
| 3,694,353 | 9/1972 | Yang et al. ............................... 210/7 |
| 3,724,664 | 4/1973 | Lemberger et al. ................. 210/104 |
| 3,744,637 | * 7/1973 | Ziegler .............................. 210/195.4 |
| 3,796,321 | 3/1974 | Kosonen .............................. 210/202 |
| 3,837,494 | 9/1974 | Stevenson ............................ 210/259 |
| 3,848,765 | 11/1974 | Durkop .................................... 220/9 |

(List continued on next page.)

FOREIGN PATENT DOCUMENTS 1560-486    4/1990  (SU) .

OTHER PUBLICATIONS

Clearstream Model 500N.
Singulair Model 900.
Zabe Mult–Purpose Filter.
Clearstream Wastewater Systems, Inc.
Wastewater Technology.

Primary Examiner—Christopher Upton
(74) Attorney, Agent, or Firm—Roy, Kiesel & Tucker

(57) ABSTRACT

A wastewater treatment system having a treatment chamber and a clarifier chamber, the treatment chamber having a floor, the clarifier chamber separated from the treatment chamber by a common partition, the clarifier chamber having a top portion and a bottom portion, the clarifier chamber having an opening into the treatment chamber near the bottom of the clarifier, where the common partition is inclined near the area of the clarifier opening, and clarifier chamber being designed so that when wastewater is positioned therein, some solids suspended in the wastewater in the clarifier chamber settle out and exit the clarifier opening, a current in the wastewater in the treatment chamber, where the current passes across the floor of said treatment chamber near the opening of the clarifier, the current being sufficient to substantially prevent a build up of solids on the treatment chamber floor beneath the clarifier opening where the current does not keep all solids within said treatment chamber suspended within the treatment chamber.

13 Claims, 8 Drawing Sheets

U.S. PATENT DOCUMENTS

| | | | | |
|---|---|---|---|---|
| 3,871,999 | | 3/1975 | Torpey | 210/16 |
| 3,907,672 | * | 9/1975 | Milne | 210/195.4 |
| 3,919,086 | | 11/1975 | Peck et al. | 210/197 |
| 3,920,779 | | 11/1975 | Abele | 261/87 |
| 3,923,656 | | 12/1975 | Krebs et al. | 210/86 |
| 3,923,657 | | 12/1975 | Roser | 210/95 |
| 3,951,817 | | 4/1976 | Snyder | 210/521 |
| 3,980,556 | | 9/1976 | Besik | 210/6 |
| 3,992,299 | | 11/1976 | Wray | 210/152 |
| 3,994,802 | | 11/1976 | Casey et al. | 210/5 |
| 4,009,106 | | 2/1977 | Smith | 210/195 |
| 4,021,347 | | 5/1977 | Teller et al. | 210/195 |
| 4,043,936 | | 8/1977 | Francis et al. | 252/301.1 |
| 4,054,524 | | 10/1977 | Mackrle et al. | 210/195 |
| 4,070,423 | | 1/1978 | Pierce | 261/77 |
| 4,173,531 | | 11/1979 | Matsch et al. | 210/5 |
| 4,211,654 | | 7/1980 | Weber et al. | 210/104 |
| 4,238,338 | | 12/1980 | Kinzer | 210/195.4 |
| 4,246,114 | | 1/1981 | Krebs et al. | 210/151 |
| 4,259,185 | | 3/1981 | Mixon | 210/195.3 |
| 4,390,422 | * | 6/1983 | Mackrle et al. | 210/195.4 |
| 4,391,002 | | 7/1983 | Marti | 4/321 |
| 4,408,742 | | 10/1983 | Korb | 248/74 |
| 4,503,813 | | 3/1985 | Graves | 210/86 |
| 4,572,695 | | 2/1986 | Gilb | 403/232.1 |
| 4,608,157 | | 8/1986 | Graves | 210/86 |
| 4,642,138 | | 2/1987 | Koyase et al. | 134/22.18 |
| 4,650,577 | | 3/1987 | Hansel | 210/195.3 |
| 4,664,795 | | 5/1987 | Stegall et al. | 210/202 |
| 4,696,186 | | 9/1987 | Sharp | 73/49.2 |
| 4,700,737 | | 10/1987 | Nelson | 137/355.27 |
| 4,708,015 | | 11/1987 | Sharp | 73/49.2 |
| 4,805,445 | | 2/1989 | Grappe | 73/49.2 |
| 4,834,879 | | 5/1989 | Stegall et al. | 210/205 |
| 4,836,710 | | 6/1989 | Sawada | 405/54 |
| 4,925,046 | | 5/1990 | Sharp | 220/5 |
| 4,929,349 | | 5/1990 | Beckham | 210/151 |
| 4,939,833 | | 7/1990 | Thomas | 29/401 |
| 4,975,197 | | 12/1990 | Wittman et al. | 210/626 |
| 4,983,285 | | 1/1991 | Nolen | 210/197 |
| 4,986,905 | | 1/1991 | White | 210/104 |
| 5,032,276 | | 7/1991 | Mackrle et al. | 210/629 |
| 5,049,266 | | 9/1991 | Gotz | 210/151 |
| 5,052,216 | | 10/1991 | Sharp | 73/49.2 |
| 5,081,864 | | 1/1992 | Zaim | 73/49.2 |
| 5,104,542 | | 4/1992 | Dixon et al. | 210/532.2 |
| 5,117,677 | | 6/1992 | Hendershot et al. | 73/49.2 |
| 5,167,142 | | 12/1992 | Sharp | 73/49.2 |
| 5,184,504 | | 2/1993 | Spring | 73/49.2 |
| 5,200,065 | | 4/1993 | Sinclair et al. | 210/104 |
| 5,211,847 | | 5/1993 | Kanow | 210/610 |
| 5,221,470 | | 6/1993 | McKinney | 210/151 |
| 5,259,673 | | 11/1993 | Christopher | 374/43 |
| 5,265,465 | | 11/1993 | Thomas | 73/49.2 |
| 5,266,239 | | 11/1993 | Drewery | 261/64.3 |
| 5,288,406 | | 2/1994 | Stein | 210/614 |
| 5,288,407 | | 2/1994 | Bodwell et al. | 210/617 |
| 5,482,630 | | 1/1996 | Lee et al. | 210/605 |
| 5,490,935 | | 2/1996 | Guy | 210/620 |
| 5,565,098 | | 10/1996 | Vellinga | 210/188 |
| 5,714,061 | | 2/1998 | Guy | 210/195.3 |
| 5,766,454 | | 6/1998 | Cox et al. | 210/150 |
| 5,766,459 | * | 6/1998 | Adams, Jr. | 210/256 |
| 5,783,071 | | 7/1998 | Guy | 210/195.1 |
| 5,785,854 | | 7/1998 | McKinney | 210/620 |

* cited by examiner

WASTEWATER TREATMENT SYSTEM PREVENTING THE BUILD UP OF SOLIDS BENEATH THE CLARIFIER OPENING

BACKGROUND OF THE INVENTION

1. Field of the Invention

This invention relates, generally, to the treatment of wastewater, and more particularly to creating a local current in a small wastewater treatment system, such as is suitable for residential use, and to help reduce the build up of solids at certain locations within the wastewater treatment system.

2. Prior Art

Numerous devices are known in the art for the treatment of wastewater. Most treatment systems have a configuration which includes a first chamber for aeration of the wastewater, a second chamber for removing suspended solids, an inlet for feeding the wastewater into the tank, and an outlet for letting the treated water out. The first chamber is a treatment chamber where much of the biological activity in a wastewater treatment system takes place. In the treatment chamber, air is required for microbes to aerobically operate on the wastes in the wastewater (both solid and liquid wastes). Air is usually injected into the treatment system in a variety of locations in the treatment tank. The release locations are chosen to insure that sufficient air (oxygen) is present and fairly evenly distributed throughout the entire treatment chamber to support aerobic activity. Another concern is that adequate mixing takes place in the treatment system to keep most of the solids present in the wastewater suspended to assist microbial degradation. Consequently, the treatment area tends to be a fairly high energy environment.

A wastewater treatment system generally has a second tank, a clarifier chamber. Water is removed from the treatment system through the clarifier chamber. However, it is desired that the removed, or treated water, be relatively free of solids. Consequently, the clarifier chamber is designed as a low energy environment, or quiescent environment, to allow solids present in the water in the clarifier chamber to settle out.

One common type of small (generally less than 2500 gallon capacity) wastewater treatment systems incorporates both the clarifier chamber and treatment chamber into a single tank. One type of small treatment system uses a rectangular tank having a partition therein to create two chambers. The partition does not extend to the floor, thereby allowing the two chambers to be in fluid communication. Another popular treatment system in use employs a single cylindrical tank (or square tank) having an inverted cone clarifier positioned within the tank with radially spaced air pipes delivering air into the tank outside the clarifier, as illustrated in U.S. Pat. No. 4,650,577 to Bradley L. Hansel, herein incorporated by reference (hereafter referred to as the inverted cone system). The area of the tank within the clarifier is a quiescent zone allowing solids to settle out of the water prior to discharge. The area of the tank external to the clarifier is the aeration zone where mixing and oxygen transfer occurs and much of the biological activity takes place. Air is injected into the system through a series of drop lines, which may have fine bubble diffusers positioned on the ends thereof, as disclosed in U.S. Pat. No. 5,266,239 to Drewery, herein incorporated by reference.

In an aerobic treatment system, air must be provided into the system. Some treatment systems include pipes for injecting air into the wastewater in the tank to assist in the aerobic treatment of the fluid, with or without diffusers. One such example is shown in U.S. Pat. No. 4,975,197, herein incorporated by reference. Some systems have a vertical clarifying areas within the tank, such as that shown in U.S. Pat. No. 4,664,795 to Stegall, herein incorporated by reference.

Air injected into the system will create currents within the treatment tank. With multiple release locations, local currents are created about each release site. Some local currents may combine to provide an overall net current within the tank, or may form local eddies, where water circulates within a generally closed volume of the treatment tank. Prior art inverted cone treatment chambers generally had a series of air release sites placed near the bottom of the treatment tank close to the treatment tank wall. These release sites were equally spaced along the outer wall, resulting in a dead zone in the middle of the tank underneath the clarifier opening.

Solids suspended in the wastewater will be aerobically biologically degraded. If the treatment tank contains an area of low fluid velocity (circulatory "dead zones") near the tank bottom, suspended solids will settle out into a sludge onto the tank floor in these zones (zones with insufficient fluid velocity to keep solids in suspension). Circulatory dead zones tend to be oxygen deficient, promoting anoxic degradation of the sludge. Anoxic degradation results in the generation of nitrogen gas generated by the breakdown of nitrates ("denitrification"). Nitrogen gas can build up in the sludge until the sludge, or a portion thereof, is lifted up off the floor back into the treatment tank ("bulking"). Anoxic treatment zones within a treatment system are desirable, as these zones assist in promoting more complete biological degradation.

Circulatory dead zones are not desirable in all locations on the tank bottom. One area where a dead zone is undesirable is directly underneath the clarifier opening. If bulking occurs in this location, the rising solids can result in an undesirable discharge through the clarifier and disturb the clarifier's finction; additionally, a scum can form on the surface of the clarifier and because of the clarifier's quiescent environment, such a scum layer is difficult to remove. Unfortunately, solids tend to settle at this location. The clarifier is designed to allow solids to settle out through the clarifier opening. Consequently, some means must be provided to keep these settling solids from being deposited underneath the clarifier opening.

The prior art attempted to prevent the build up of solids beneath the clarifier opening by providing a diverter (usually a cone or pyramidal shaped deflector) underneath the opening to divert settling solids out of the dead zone and back into the high energy treatment zone. In rectangular tanks, the clarifier is separated from the treatment tank by a common partition (not inclined), with an opening at the bottom of the partition to allow fluid communication. Positioned near this opening in the bottom of the clarifier, was an inclined plane to divert settling solids back into the treatment chamber. These devices were needed as the area beneath the opening of the clarifier tended to be a circulatory dead zone. One such device can be seen in U.S. Pat. No. 5,714,061.

One attempt to prevent a solids build up beneath the clarifier without the use of a diverter is shown in U.S. Pat. No. 5,785,854 to McKinney, herein incorporated by reference. McKinney demonstrates release of air near the sidewall of the treatment tank at a single location to create a particular current within the tank. The current pattern, as shown by McKinney, sweeps across the tank bottom directed toward the air release site thereby sweeping solids, which settle out from the clarifier onto the tank bottom, back into the treatment area. Unfortunately, to create this sweeping pattern, the McKinney current must travel up the sidewall, around the clarifier partition, then down the opposite tank sidewall before sweeping across the tank bottom near the clarifier opening. Such a long current path implies that much of the energy and velocity of the current near the generating source (the air release site) will be lost to overall circulation, making the current sweeping the bottom weak and potentially insufficient to keep solids suspended. Additionally, the McKinney current is generated through air release at a single location in the tank. Air release at a single location can result in insufficient mixing within the entire treatment chamber and inefficient oxygen transfer into the tank as a whole. To address this problem, McKinney suggests using multiple air drops at the same release location. Finally, with use of a single air release site near the sidewall, McKinney indicates that no circulatory dead zones are formed, even though such dead zone, properly placed, are useful.

OBJECTS OF THE INVENTION

It is an object of the present invention to provide a simple two chambered wastewater treatment system having a current to keep solids from depositing near the clarifier opening into the treatment chamber.

It is an object of the present invention to provide a simple two chambered wastewater treatment system having a current to keep solids from depositing near the clarifier opening into the treatment chamber using multiple air release sites.

It is an object of the present invention to provide a simple two chambered wastewater treatment system having a current to keep solids from depositing near the clarifier opening into the treatment chamber using multiple air release sites, but allowing solids to deposit elsewhere in the tank bottom.

It is an object of the present invention to provide a simple two chambered wastewater treatment system having a current to keep solids from depositing near the clarifier opening into the treatment chamber using multiple air release sites, generated by a single air release site in the shadow zone of the clarifier.

SUMMARY OF THE INVENTION

A current in a wastewater treatment system, where the treatment system has a treatment chamber and a clarifier chamber, the treatment chamber having a floor, where the clarifier chamber is separated from the treatment chamber by a common inclined partition, the clarifier chamber having a top portion and a bottom portion, the clarifier chamber opening into the treatment chamber near the bottom of the clarifier, the clarifier chamber being designed so that when wastewater is positioned therein, some solids suspended in said wastewater in the clarifier chamber settle out and exit the clarifier opening, where the current in the treatment chamber passes across the floor of the treatment chamber near the opening of said clarifier, the current being sufficient to substantially prevent a build up of solids on the treatment chamber floor beneath the clarifier opening where the current does not necessarily keep all solids within the treatment chamber suspended within the treatment chamber.

BRIEF DESCRIPTION OF THE DRAWINGS

FIG. 4 depicts the flow pattern when one air release location is located in the shadow zone;

FIG. 5 depicts the flow pattern with two air release locations, one in the shadow zone and one outside the shadow zone.

FIG. 6 depicts the flow pattern with two air release locations, both outside the shadow zone at an angular spacing of 45 degrees.

FIG. 7 depicts the flow pattern with three air release locations, one in the shadow zone and two outside the shadow zone.

FIG. 8 depicts the flow pattern with three air release locations, all outside the shadow zone.

FIG. 8a is a bottom cross-sectional view depicting the flow near the bottom of the tank while

DETAILED DESCRIPTION

Figure 1:
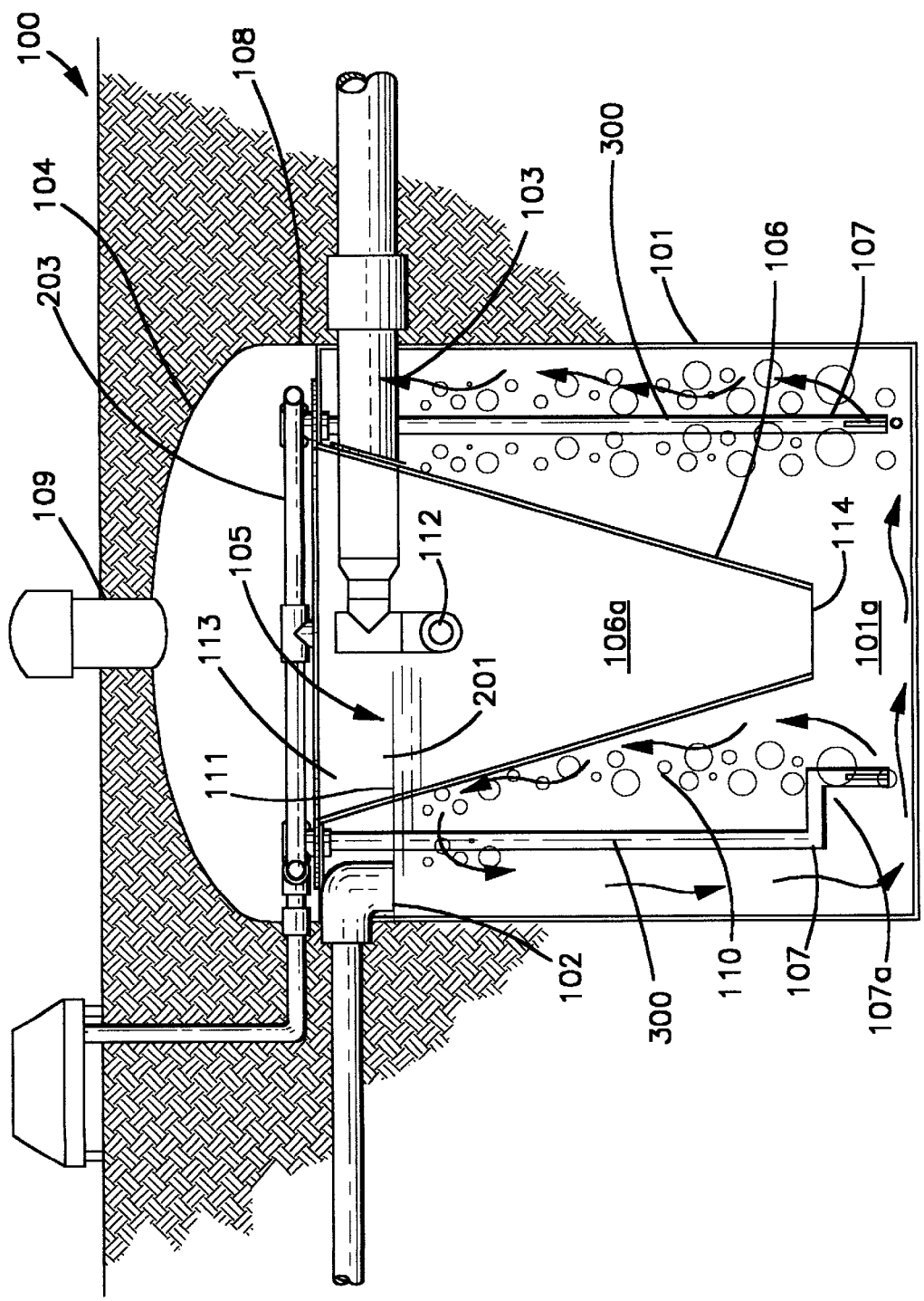
FIG. 1 is a sectional view of the invention taken in a vertical plane which bisects an embodiment of the treatment apparatus.

FIG. 1 is a sectional view of a inverted cone treatment tank in a vertical plane which bisects the treatment apparatus 100. The main components of treatment apparatus 100 are tank 101, tank inlet 102, tank outlet 103, cover 104, and an air distribution header 205. In the embodiment depicted, treatment apparatus 100 also includes clarifier chamber 106 and air injectors 107. Tank 101 is depicted as a vertically oriented cylindrical vessel although the invention could also be practiced in tanks of other shapes, such as a cube. Tank 101 may be constructed of any strong water resistant material including but not limited to concrete, fiberglass, polyethylene, PVC, or steel.

Figure 2:
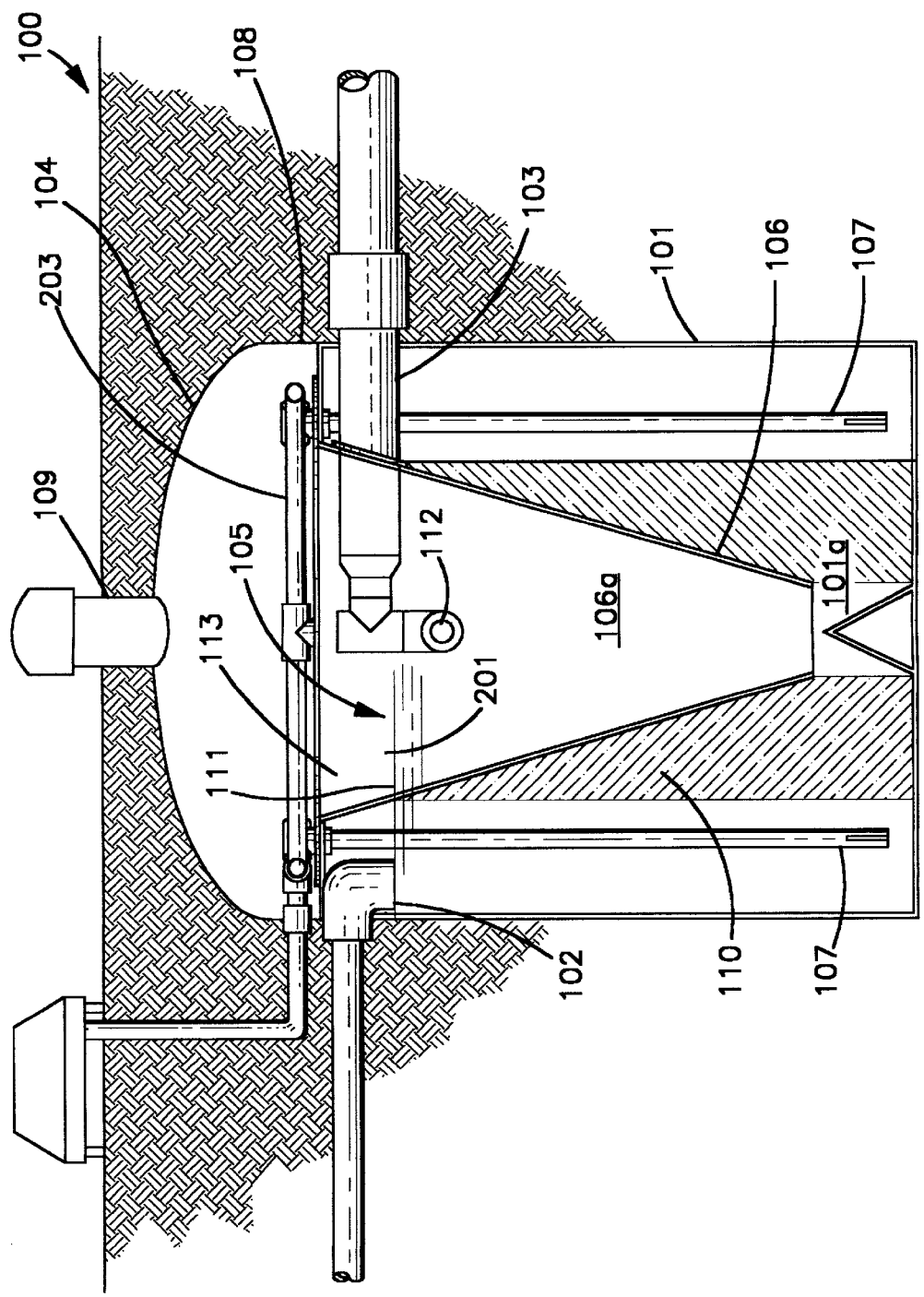
FIG. 2 is a sectional view of a prior air drop design depicting the shadow zone.
Figure 3:
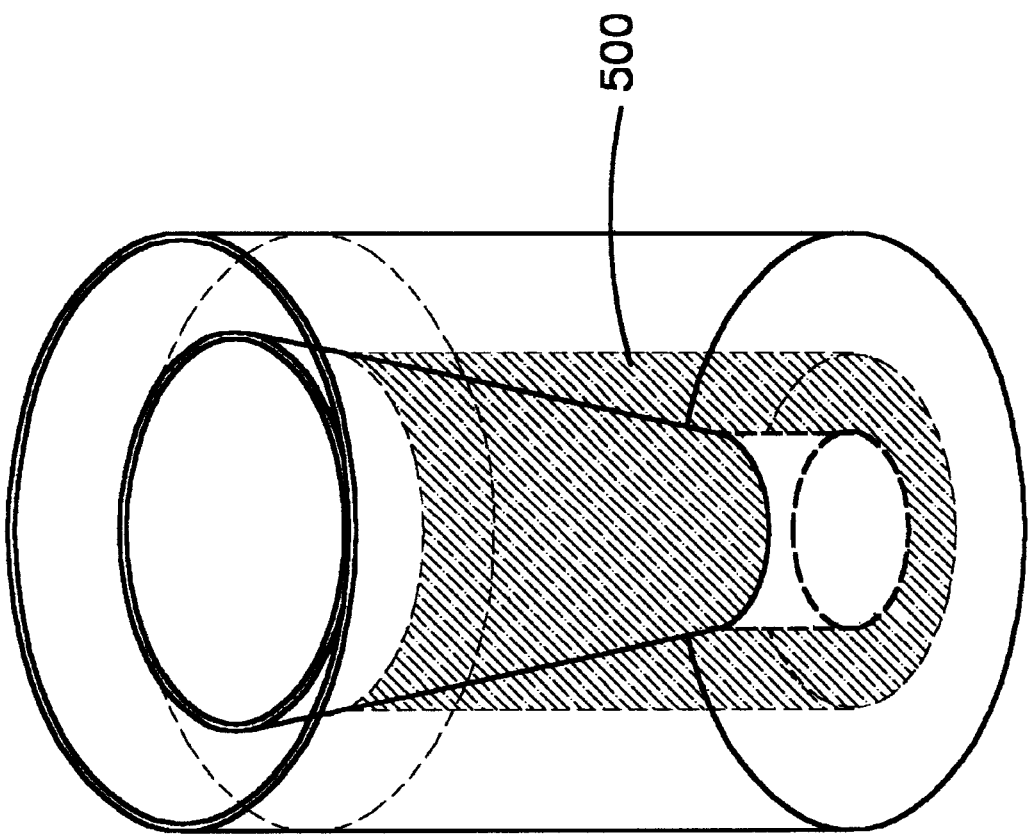
FIG. 3 is a isometric view depicting the shadow zone of the clarifier wall.

As shown, clarifier chamber is a walled structure 106 internal to tank 101, having an interior which defines a clarifier chamber 106a. The interior of tank 101, excluding clarifier area 106a, defines the primary treatment chamber 110a. Clarifier chamber and treatment chamber are separated by a common partition, that portion of the clarifier wall 106 in the wastewater. The common partition should be inclined near the area of downward facing clarifier opening 114 to assist in removing settling solids from the clarifier chamber 106a. The inclined partition defines a shadow zone within the treatment chamber, shown in FIG. 2. As shown in FIG. 3, the shadow zone 500 is that portion of the treatment chamber which would be within the "shadow" cast by the inclined plane (excluding that portion of the inclined plane above the water level, and the area beneath the opening of the clarifier) if the inclined plane were illuminated from above.

As shown in FIG. 1, wastewater 110 is contained in tank 101, and is present in primary treatment area 101a and clarifier area 106a. Wastewater 110 forms a wastewater/air interface 111 in tank 101; in the apparatus as shown, wastewater/air interface 111 is at essentially the same level in both the treatment chamber 101a and the clarifier chamber 106a. Cover 104 may have top opening 109 which may be used for servicing of treatment apparatus 100 without the need to completely remove cover 104.

Wastewater 110 enters tank 101 via tank inlet 102. Wastewater 110 is treated in tank 101 by the action of aerobic organisms. In the embodiment shown, the growth of aerobic organisms is assisted by air injectors 107. Air or gas may be provided by a gas source, which can be ambient air delivered by a blower, or a bottled gas, such as air, or compressed gas supplied by a compressor. Air is generally introduced into the treatment chamber near the bottom of the treatment chamber through a series of air drops 300, fed through an air distribution header 203. When multiple air drops are used, it is desirable that each be located at approximately the same depth to insure even distribution of air from each air drop. To assist in such distribution, the opening in the air drop may be a pattern such as that shown in U.S. patent application Ser. No. 08/961,449, assigned to Delta Environmental Products, Inc., herein incorporated by reference.

Additionally, each air drop may terminate in a diffuser to assist in production of fine bubbles for efficient oxygen transfer into the wastewater. Diffuser may be a 1–3 inch PVC pipe with holes in the sidewall, covered by an air permeable membrane.

Tank 101 has at least one submerged opening 112 through which wastewater 110 may exit tank 101. Submerged opening 112 is located a sufficient distance below surface 111 so as to prevent scum layer 105 from entering submerged opening 112. Clarifier 106 assists in the more complete treatment of wastewater 110 by causing greater circulation of wastewater 110 as shown by the arrows in FIG. 1. Clarifier 106 can be pyramid-shaped or cone-shaped, as depicted here, or other shapes, and has clarifier top opening 113 which is a bigger opening than clarifier bottom opening 114, hence, clarifier walls form an inclined partition. Clarifier 106 is constructed so that clarifier top opening 113 will be above surface 111 of wastewater 110, and usually above scum layer 105.

Single Air Release Site in the Shadow Zone

Figure 4A:
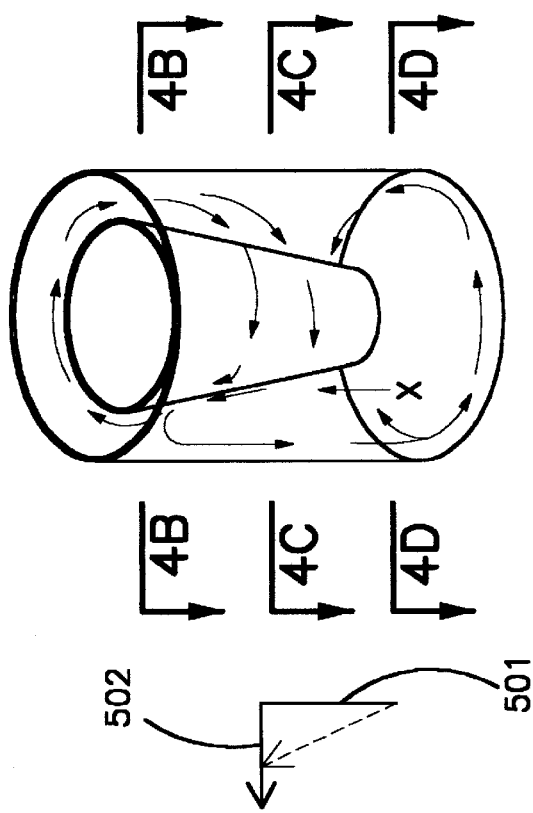
FIG. 4a is an isometric view.
Figure 4E:
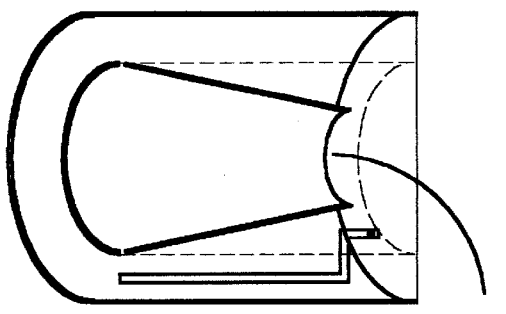
FIG. 4e is a vertical cross-sectional view depiction placement of the air release location.

Shown in FIG. 4a an isometric view of a treatment system having a single air release location, where the location of the release site is located within the shadow zone. Shown are the major local current components generated by air release at this site. It is preferred that the release location be placed in the shadow zone close to but above the bottom of the partition, and near the partition wall, as shown in FIG. 4e. The location should be chosen to minimize released air from entering the clarifier opening and disrupting the established quiescent zone. A location near the bottom of the tank and close to the opening is also preferred to assist in providing even oxygen distribution and to provide the current, generated by the rising bubbles, with a horizontal velocity component (the velocity components, in the vertical (501) and horizontal (502) directions, is depicted in FIG. 4A).

As shown, the current, in the vicinity of the air release location, rises up the clarifier partition, drawn up by the rising air bubbles. When this current reaches the surface, a portion of the current then drops down the treatment system outer wall, again, near the vicinity of the release site, then across the bottom of the clarifier, then rising up the wall of the treatment system a distance, to be drawn back around the clarifier partition, where the cycle repeats itself. Other portions of the current flow in the tank are depicted in FIG. 4A.

Figure 4D:
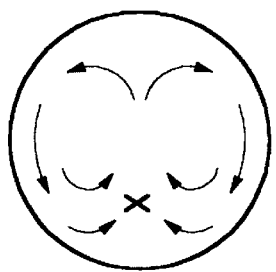
FIG. 4d is a bottom cross-sectional view.
Figure 4C:
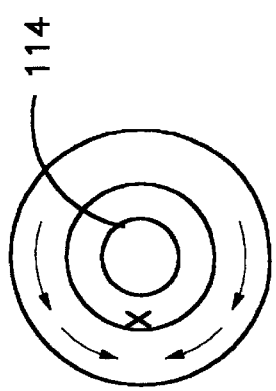
FIG. 4c is a mid cross-sectional view.
Figure 4B:
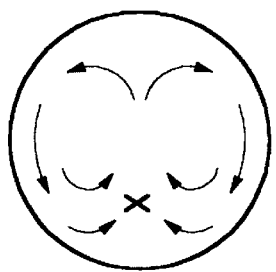
FIG. 4b is a top cross-sectional view.

Shown in FIG. 4c is a horizontal cross section near the middle of the tank showing the approximate flow pattern, and shown in FIG. 4b is the approximate flow pattern near the surface of the treatment system, and in FIG. 4d is the approximate flow pattern across the bottom of the tank. The "x" shown in these figures reflects the air release location which is the driving force for the current flow. As can be seen, the surface current pattern (FIG. 4b) is generally opposite that near the middle of the tank (FIG. 4c), as flow is back toward the air release location. The surface current is created when the bubbles break the surface of the wastewater, where the vertical velocity component drops to zero, leaving only the horizontal component. These surface currents follow two paths around the clarifier partition, and rejoin into a downward going current at a path distance between the two release locations (assuming that air is injected at substantially equal rates at each release location). Thence, the currents pass around the clarifier partition, where the cycle repeats.

Flow generated by air release in the tanks is not laminar, but is somewhat turbulent. The current flow depicted is a net current flow over a period of time. That is, at any given time, the current flow could be somewhat different, as the flow pattern is not static, but dynamic. However, averaged over time, a net flow should be experienced similar to that shown in the diagrams.

Figure 9B:
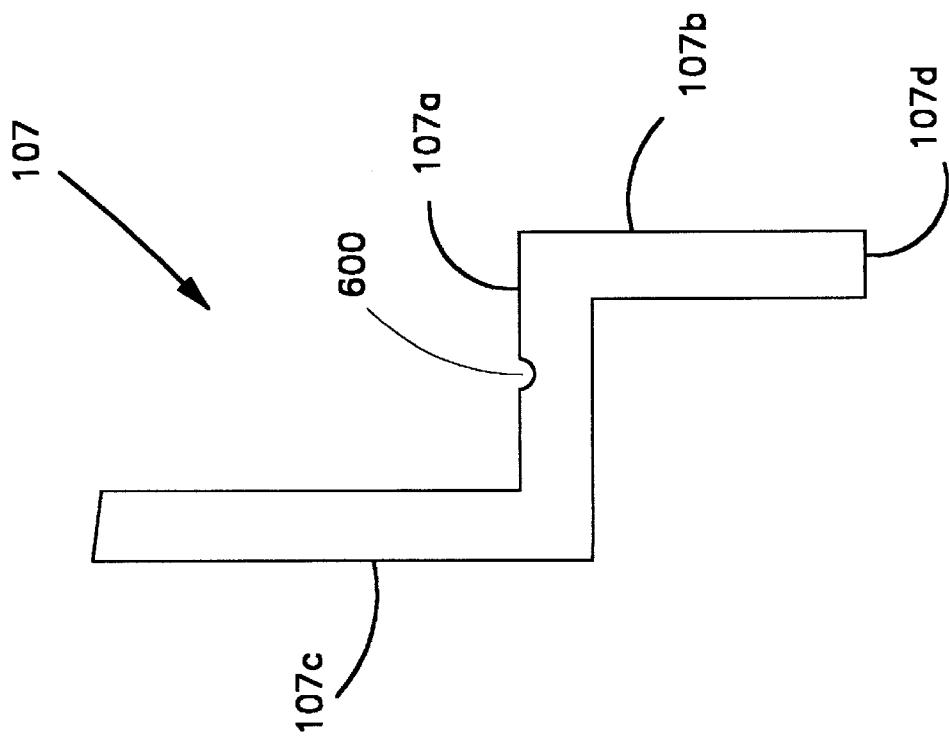
FIGS. 9a and 9b depict isometric views of two embodiments of a dog-leg air injector.
Figure 9A:
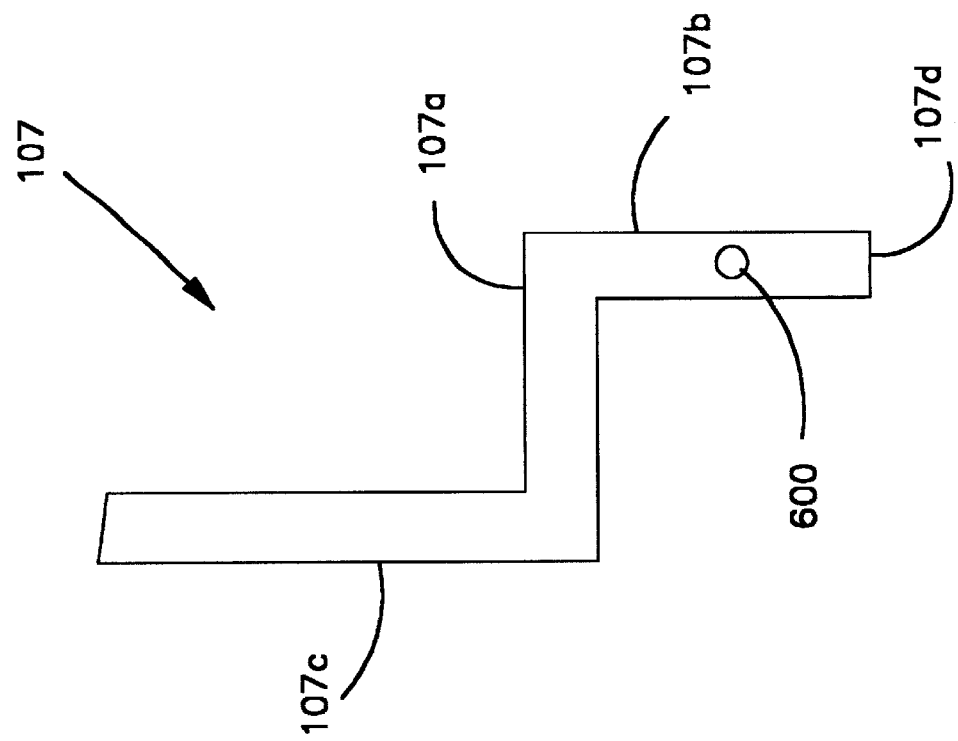

Depicted in FIG. 9a is one air injector 107 for releasing air into the shadow zone. The air injector 107 ties into the air distribution header 205 at the tank top. Air injector is constructed of ¾ inch PVC pipe. Because the air distribution header 205 is generally located on the circumference of the treatment tank near the top of the tank, the air injector will require a down drop section, 107c, and an offset section 107a, to enable the release site to be located in the shadow zone of the tank near the bottom of the tank. For instance, on a 500 gallon tank (diameter of about 6 feet), the air drop horizontal offset section 107a can be about 15 inches, with a second vertical drop section 107b of about 6 inches. This arrangement will place the air release site 600, the openings in the side wall of section 107 at about 3 inches off the bottom of the tank and about 6 inches from the clarifier inclined wall, adjacent to area of air release site. As shown, release site 600 is an opening in the sidewall of injector 107, about 3 inches up from the bottom opening of injector 107. Opening is generally placed 90 degrees from that shown in FIG. 9a (that is, facing clarifier) but, for ease of display, is as shown. Air injector 107 should be open at its terminus, 107d. This arrangement (offset and second down portion) will be referred to as a dog-leg air injector. The dog-leg is designed to produce the desired horizontal offset and is shown in three sections which are easily manufactured from standard PVC pipe and pipe joints. It is possible to produce the desired offset with other methods, such as using curved tubing, or to have the air injector follow the incline plane of the clarifier wall.

A second type of dog-leg air injector is shown in FIG. 9b. Again, there is a first down drop portion 107c, offset portion 107a and second down drop portion 107b. The air injector 107 is open at the bottom, 107d, but the air release site 600 is now located in the offset portion 107a. Air release site may be a 3/16–1/2 inch opening, with 1/4 inch opening preferred, in top portion of horizontal offset portion 107a. To place air release site for injector of FIG. 9b in same general location as injector in FIG. 9a, offset portion 107a is 18 inches long, with release site 600 located about 3 inches from second down drop 107b, and second down drop 107b is about 3 inches in length.

Air is provided to this shadow zone location by using a standard air drop tube, having an offset section 107a as depicted in FIG. 1. If multiple air drops are used, as later described, it is desired that the air release height (measured from the tank floor) for each air drop location be substantially equal. If diffusers are not used, it is desirable that each air drop be constructed with a sidewall opening or slit as shown and described in U.S. patent application Ser. No. 08/961,449, herein incorporated by reference. As can be seen, the bottom current sweeps across the clarifier opening without the necessity of losing energy by traveling around the clarifier.

The air release locations fall into two broad categories, shadow zone release sites, which produce the general flow pattern shown in FIG. 9, and air release site outside of the shadow zone, producing a flow pattern as described in McKinney. By injecting air using a combination of these two release sites, a variety of flow patterns can be produced which provide a net current flow on the bottom of the tank underneath the clarifier opening, thus preventing solids from depositing at this location.

Two Air Release Sites, One of Which is a Shadow Zone Location

Shown in FIG. 5 is a stylized flow pattern generated by two air release locations, in a spaced apart relationship. As is shown, the first location is in the shadow zone of the tank, while the second is not. The two locations lie substantially on a diameter D. The second location is near the outer wall of the treatment tank. FIG. 5a is an isometric view of the treatment system, while FIG. 5c is a horizontal cross section of the treatment system showing the net current generated across the bottom of the tank. FIG. 5b demonstrates the flow pattern near the surface of the tank. Note that with the addition of more than one air release location, the flow patterns within the tank are more difficult to predict and depict. Eddy currents can be established and zones of low velocity will be created, resulting in areas where solids will settle out (circulatory dead zones). These zones where solids can settle are indicated by the dashed areas 1000. While the two release locations are shown located on a tank diameter D, such location is not necessary, but preferred, when one air release location is in the shadow zone. Other locations for two air drops (one in shadow zone and one not) can be devised by applying and combining the flow patterns produced by a site in the shadow zone, and a site outside of the shadow zone, as previously described above and in McKinney, modified for the shape of the tank and clarifier chamber in question.

The air injectors 107 used for release in the shadow zone location should be of the dog-leg type. However, it has been found that dog-leg type of air injectors 107 can also be used for non-shadow zone air release sites. The offset section 107a allows air to be released a distance away from the first down portion 107a, thus helping to reduce interaction of the released air bubbles with the surface of the first down portion 107a. Interaction will create undesirable additional frictional losses in the current flow, and can also result in the undesirable coalescence of air bubbles resulting from the interaction, producing larger bubbles.

Figure 5D:
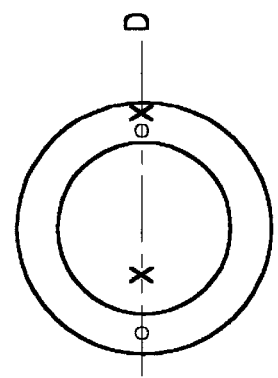
FIG. 5d is a top cross-sectional view depicting the relative locations of the first air down drop sections and air release sites.
Figure 5C:
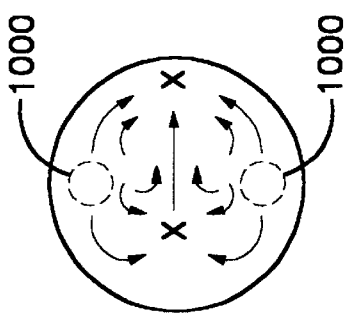
FIG. 5c is a bottom cross-sectional view.
Figure 5A:
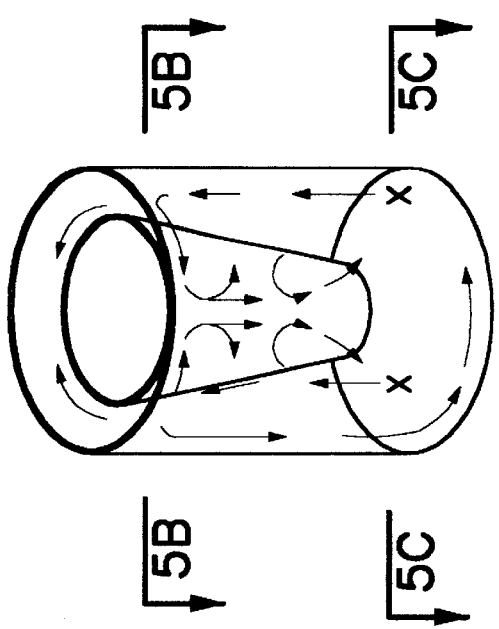
FIG. 5a is an isometric view.
Figure 5B:
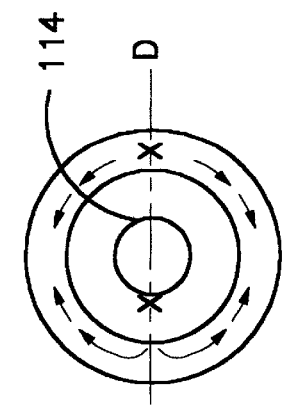
FIG. 5b is a top cross-sectional view.
Figure 6A:
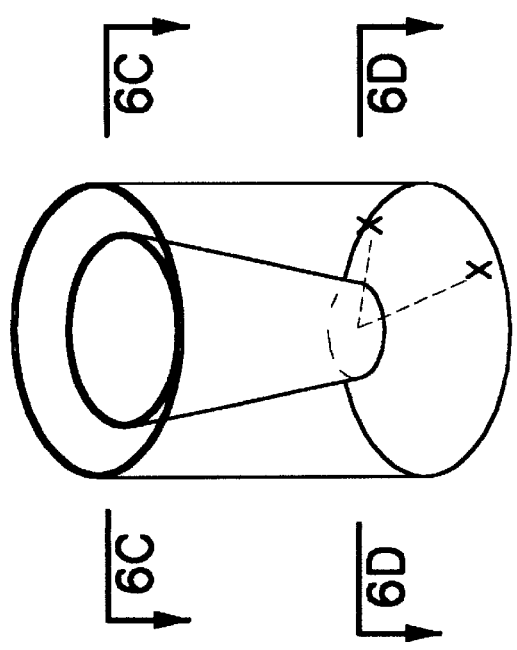
FIG. 6a is an isometric view.
Figure 6D:
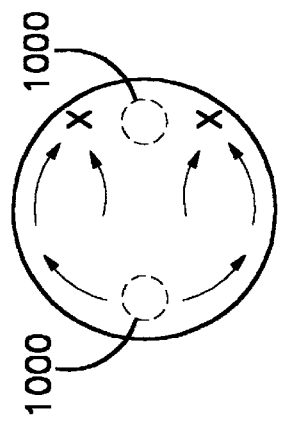
FIG. 6d is a bottom cross-sectional view depicting the bottom flow patterns.
Figure 6C:
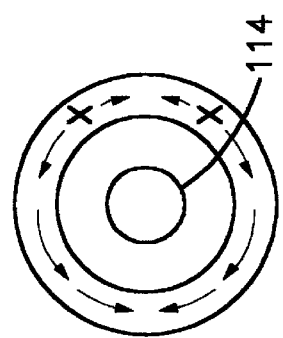
FIG. 6c is a top cross-sectional view depicting the flow patterns.
Figure 6B:
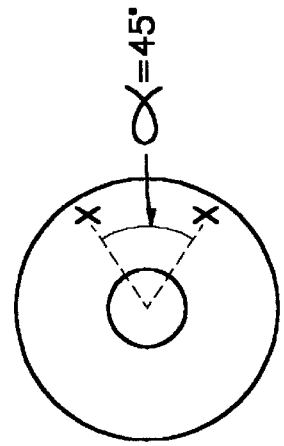
FIG. 6b is a cross-sectional view depicting the angular spacing of the air release sites.

A dog-leg for a non-shadow zone site should have an offset section 107a of sufficiently short length to insure that air release site 600 is not located in the shadow zone. For instance, a 3 inch offset section 107a has been found suitable. Additionally, with incorporation of an offset section, the offset may be positioned in a 360 degree orientation about the first down leg section 107c. One angular position is shown in FIG. 5d. In this figure, location of the first down section is indicated by the "o" mark, with the air release locations indicated by the "x" mark. The arrangement of the dog-leg sections, as show, are again on the diameter D, with both offset sections lying on the diameter D.

Two Air Release sites, None in Shadow Zone

Shown in FIG. 6 is a stylized flow pattern generated by two air release locations, in a spaced apart relationship. As is shown, neither location is in the shadow zone, both being located along the periphery of the treatment tank near the bottom of the tank. As shown, the two locations are not spaced along a diameter, but are shown spaced 45 degrees apart (measured as an angle through the center of the tank), depicted in FIG. 6b. Placement along a diameter would produce a circulatory dead zone beneath the clarifier. (Such a dead zone could be avoided if the air flow rates (or air release rates) at each location were not equal. By creating unequal flow rates, a pattern similar to that produced by unequal placement with equal flow rates can be approximated). FIG. 6a is an isometric view of the system, with the X's marking the placement of the release sites, while FIG. 6d is a horizontal cross section, demonstrating the net current generated across the bottom of the tank. FIG. 6c demonstrates the flow pattern near the surface of the tank. Again, with the addition of more than one air release location, the flow patterns within the tank are more difficult to predict and depict. Eddy currents can be established and zones of low velocity will be created, resulting in areas where solids will settle out. These zones where solids can settle are again indicated by the dashed areas 1000. As is shown, the flow across the bottom is generally along the bisector between the two air release locations, and the flow is directed toward the air release locations.

A similar current across the bottom can be created with two locations in the shadow zone. The flow across the bottom, again will be generally along the line bisecting the location of the two air release locations, but the flow across the tank bottom will be away from the air release locations, instead of toward the air release locations.

As above, the air injectors may be drop tubes, dog-legs, or some other arrangement.

Three Air Release Sites, One in the Shadow Zone

Figure 7C:
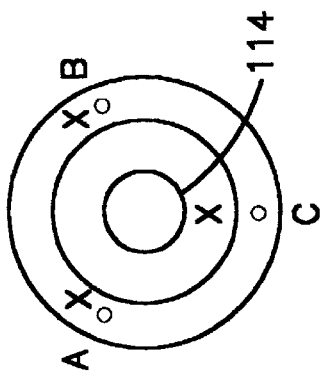
FIG. 7c is a top cross-sectional view depicting the relative locations of the first air down drop sections and air release sites.
Figure 7B:
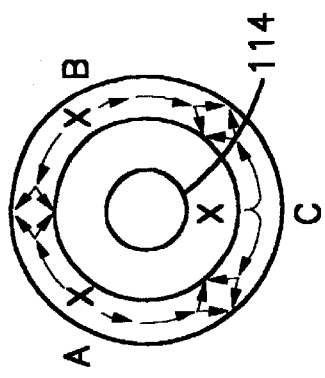
FIG. 7b is a top cross-sectional view depicting the flow near the surface of the tank.
Figure 7A:
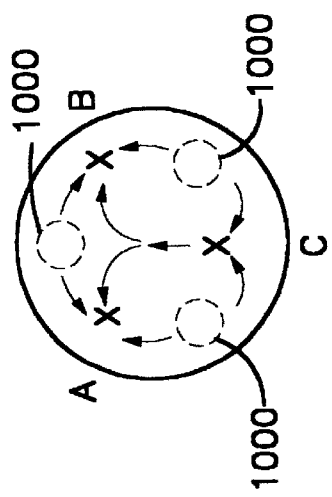
FIG. 7a is a bottom cross-sectional view depicting the flow near the bottom of the tank.

Shown in FIG. 7 is a stylized flow pattern generated by three air release locations (A, B, and C), in a spaced apart relationship. As is shown, the C location is in the shadow zone of the tank, while the A and B locations are not. As shown, the three locations are spaced as follows (in angular measurement along the circumference), from location A to B (both outside of shadow zone) angles of 0–180 degrees, with 150 degrees being preferred. The third release site, C, in the shadow zone, is shown on the "opposite" side of the tank containing sites A and B (preferably, location C will be located on the bisector of sites A and B). All locations are situated about 1–6 inches off the floor (3 inches is generally preferred), with location A & B being about 1–3 inches from the outer wall, while location C is located about 4–10 inches from the outer circumference of the clarifier opening. Again, the location of C is chosen so that bubbles do not enter clarifier opening. FIG. 7a is a horizontal cross section, demonstrating the net current generated across the bottom of the tank. FIG. 7b demonstrates the flow pattern near the surface of the tank. Eddy currents can be established and zones of low velocity will be created, resulting in areas where solids will settle out. These zones where solids can settle are indicated by the dashed areas 1000. In testing this configuration, an air supply of 3.0–4.0 cfm was used to feed all three air release locations through ¾" PVC piping, in a treatment system designed to treat 500 gal/day. When the size of the tank changes, the capacity of the air pump should change also: for instance, in a 600 gal/day tank, 3.5–4.5 cfm has been used, while in a 400 gal/day tank, 2.5–3.5 cfm has been used.

One arrangement using three dog-leg type of air injectors 107 is shown in the top view of a treatment tank of FIG. 7c. As shown, the "o" marks indicate the location of the first down drop section 107c of the air injector 107, while the "x" mark indicates the location of the air release site 600. As shown, all dog-leg air injectors are substantially parallel, with the non-shadow zone release sites located near the outer circumference of the tank.

Three Air Release Pattern, None in Shadow Zone

As can be seen, a variety of combinations of release locations create a current across the bottom of the tank under the clarifier mouth. To keep solids from depositing under the clarifier opening, only the flow patterns established at this location, on the bottom of the tank need to be understood. The flow patterns in the rest of the tank are not relevant, as long as sufficient mixing is established and sufficient oxygen is transferred into the wastewater to support aerobic metabolism. Similarly, the flow patterns elsewhere on the bottom of the tank also are not relevant. In fact, as mentioned above, with more than one release site it is not unlikely that solids will be deposited (by deposited, it is meant that some solids settle out, but the deposition site may migrate about the tank bottom, and some of the settled solids may be drawn back up into the treatment tank while other solids are deposited).

In the case of a clarifier centered in the treatment tank, where all release locations are placed along the outer wall or periphery of the treatment tank (that is, not within the shadow zone of the clarifier partition), spacing must not be equal about the periphery. Equal spacing fails to provide a current flow across the bottom of the tank (assuming all release locations have equal air release rates). The spacing required is that spacing which produces a net current across the center with sufficient velocity to keep solids in suspension.

Figure 8B:
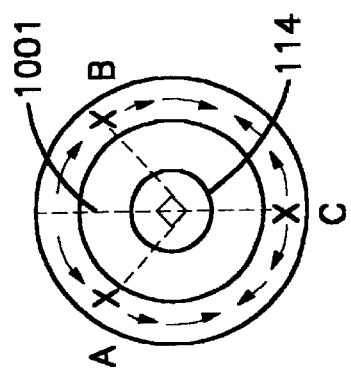
FIG. 8b is a top cross-sectional view depicting the flow near the surface of the tank.
Figure 8A:
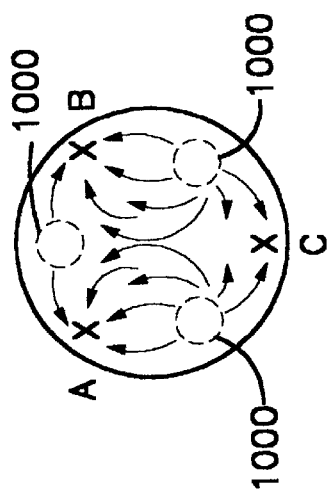

The following may be used as a general guide for predicting the suitability of air release locations. Shown in FIG. 8 is a three release location system, with location A, B, and C, on the periphery at angular spacing of 90 degrees (between A and B), 135 degrees (between B and C) and 135 degrees (between C and A). In this instance, assuming a 0.2 ft/sec local velocity is generated on the bottom by each air drop (with the flow being in a radial direction toward the air drop location) the components of the net velocity at the tank bottom center (underneath the clarifier opening) would be approximately along the direction on the bisector 1001 between sites A and B, and would be of the order of magnitude of about [1−2*(1*cos 45)]*0.2=−083 ft/sec. This generally will not be sufficient to keep particles in suspension. If locations A and B are instead 45 degrees apart, the net velocity would be [1−2*(1*cos 22.5)]*0.2=−0.17 feet/ sec. (In general, velocities above 0.2 feet sec are desired to keep typical residential solids in suspension (such a velocity is, however, not sufficient to keep sand particles in suspension)). Note the above calculation is an over simplification of the actual flow patterns and velocities, because the flow is not laminar, flow patterns are complex when more than one release site is present, particularly due to the presence of eddy currents, and the flow pattern is not static but dynamic. However, the above can be used as a general guide to help experiment with placement of air release sites. (Note, if using this method for a shadow zone air release site, the velocity near this release site will not be the same value as near a non-shadow zone air release site, nor will the direction be the same).

From the above, it should be obvious that a large variety of configurations using one or a plurality of air release sites (such as 4, 5, 6 or more) can achieve the desired results—a current flow across the bottom of the tank in the vicinity of the clarifier opening sufficient to keep solids from settling.

There are of course other alternate embodiments which are obvious from the foregoing descriptions of the invention which are intended to be included within the scope of the invention as defined by the following claims. The above description was given in reference to the inverted cone tank system, and could be applied to any system where the clarifier chamber is surrounded by the treatment chamber. However, the invention is broader in application. The invention disclosed should be applicable to a treatment system having the clarifier chamber separated from the treatment chamber by a common wall, where the clarifier chamber may not be completely surrounded by the treatment chamber. The common wall should be inclined near the clarifier opening, and the clarifier opens generally downwardly into the treatment chamber.

We claim:

1. A wastewater treatment system comprising a treatment chamber and a clarifier chamber, said treatment chamber having a floor, said system for treating wastewater having solids therein, said clarifier chamber separated from said treatment chamber by a common inclined partition, said clarifier chamber having a top portion and a bottom portion, said inclined partition defining a shadow zone in said treatment chamber, said inclined partition of said clarifier chamber opening into said treatment chamber near said bottom of said clarifier chamber allowing fluid communication between said treatment chamber and said clarifier chamber, said clarifier chamber being designed so that when wastewater is positioned in said treatment system, some solids suspended in said wastewater in said clarifier chamber settle out and exit said clarifier opening, said treatment system further having sources of air, said air being released into said treatment chamber at a first release location, a second release location and a third air release location, said first release location near said bottom of said treatment chamber within said shadow zone defined by said inclined partition, said second and said third release location not positioned in said shadow zone, said first, second and said third release locations further defined so that said air released from said locations form bubbles in said wastewater such that substantially all of said bubbles fail to enter said opening in said clarifier chamber, wherein said first release location is located adjacent or on the perpendicular bisector of said second and said third release locations.

2. A treatment system according to claim 1 further having diffusers at each of said release locations.

3. A wastewater treatment system comprising a treatment chamber and a clarifier chamber, said treatment chamber having a floor and at least one sidewall, said clarifier chamber separated from said treatment chamber by a common inclined partition, said clarifier chamber having a top portion and a bottom portion, said inclined partition defining a shadow zone in said treatment chamber, said clarifier having an opening into said treatment chamber near said bottom of said clarifier, said clarifier chamber being designed so that when wastewater is positioned therein, some solids suspended in said wastewater in said clarifier chamber settle out and exit said clarifier opening, said treatment tank system further having a source of air, said air being released into said treatment chamber at a first location a second location and a third release location, said first location being within said shadow zone defined by said inclined partition, said first location further defined so that said air released from said first location forms bubbles such that substantially all of said bubbles fail to enter said opening in said clarifier chamber, said second location being near said sidewall of said treatment chamber, where the distance between adjacent air release locations substantially varies for at least one pair of adjacent air release locations, wherein said third air release location is located near said sidewall of said treatment chamber, and said first and second air release locations are separated by an angle of about 150 degrees.

4. A wastewater treatment system comprising a treatment chamber and a clarifier chamber, said treatment chamber having a floor, said system for treating wastewater having solids therein, said clarifier chamber surrounded from said treatment chamber by a common partition, said clarifier chamber having a top portion and a bottom portion, said common partition defining a shadow zone in said treatment chamber, said partition of said clarifier chamber opening into said treatment chamber near said bottom of said clarifier chamber allowing fluid communication between said treatment chamber and said clarifier chamber, said partition being inclined near the area of said opening, said clarifier chamber being designed so that when wastewater is positioned in said treatment system, some solids suspended in said wastewater in said clarifier chamber settle out and exit said clarifier opening, said treatment system further having a source of air, said air being released into said treatment chamber at a first release location, said first release location being within said shadow zone defined by said inclined portion of said partition, said first release location further being positioned close to said clarifier opening so that air released from said first release location induces an upward current which flows along said inclined partition from close to said clarifier opening to the surface of wastewater positioned in said treatment chamber, said first release location further defined so that said air released from said first location forms bubbles in said wastewater such that substantially all of said bubbles fail to enter said opening in said clarifier chamber.

5. A treatment system according to claim 4 where said first air release location is located near said bottom of said treatment chamber.

6. A treatment system according to claim 5 further having a second air release location, said second air release location not positioned in said shadow zone.

7. A treatment system according to claim 6 further having a third air release location, said third air release location not positioned in said shadow zone.

8. A treatment system according to claim 7 wherein said first release location is located adjacent or on the perpendicular bisector of said second and said third release locations.

9. A treatment system according to claim 8 further having diffusers at each of said release locations.

10. A wastewater treatment system comprising a treatment chamber and a clarifier chamber, said treatment chamber having a floor and at least one sidewall, said clarifier chamber surrounded by said treatment chamber by a common partition, said clarifier chamber having a top portion and a bottom portion, said common partition defining a shadow zone in said treatment chamber, said clarifier having an opening into said treatment chamber near said bottom of said clarifier, said common partition being inclined near the area of said opening, said clarifier chamber being designed so that when wastewater is positioned therein, some solids suspended in said wastewater in said clarifier chamber settle out and exit said clarifier opening, said treatment tank system further having a source of air, said air being released into said treatment chamber at a first location and a second location, said first location being within said shadow zone defined by said inclined partition, said first release location further being positioned close to said clarifier opening so that air released from said first release location induces an upward current which flows along said inclined partition from close to said clarifier opening to the surface of wastewater positioned in said treatment chamber, said first location further defined so that said air released from said first location forms bubbles such that substantially all of said bubbles fail to enter said opening in said clarifier chamber, said second location being near said sidewall of said treatment chamber.

11. A wastewater treatment system according to claim 10 where said first and second release locations are positioned near said bottom of said treatment tank.

12. A wastewater treatment system according to claim 10 having a third air release location, where the distance between adjacent air release locations substantially varies for at least one pair of adjacent air release locations.

13. A wastewater treatment system according to claim 12 wherein said third air release location is located near said sidewall of said treatment chamber, and said first and second air release locations are separated by an angle of about 150 degrees.

* * * * *